July 28, 1959     R. W. WARING     2,897,424

ELECTROSTATIC APPARATUS

Filed Nov. 10, 1953     4 Sheets-Sheet 1

INVENTOR.
Robert W. Waring
BY Paul M. Grist

July 28, 1959  R. W. WARING  2,897,424
ELECTROSTATIC APPARATUS
Filed Nov. 10, 1953  4 Sheets-Sheet 2

INVENTOR.
Robert W. Waring
BY Paul M. Geist.

July 28, 1959  R. W. WARING  2,897,424
ELECTROSTATIC APPARATUS
Filed Nov. 10, 1953  4 Sheets-Sheet 3

INVENTOR.
ROBERT W. WARING
BY
*Paul M. Gist*
ATTORNEY

July 28, 1959 R. W. WARING 2,897,424
ELECTROSTATIC APPARATUS
Filed Nov. 10, 1953 4 Sheets-Sheet 4
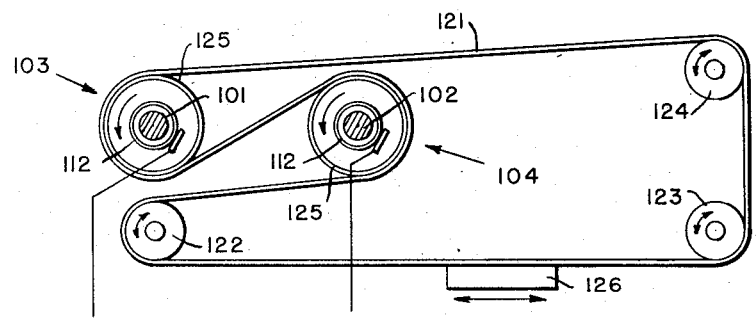
FIG. 11
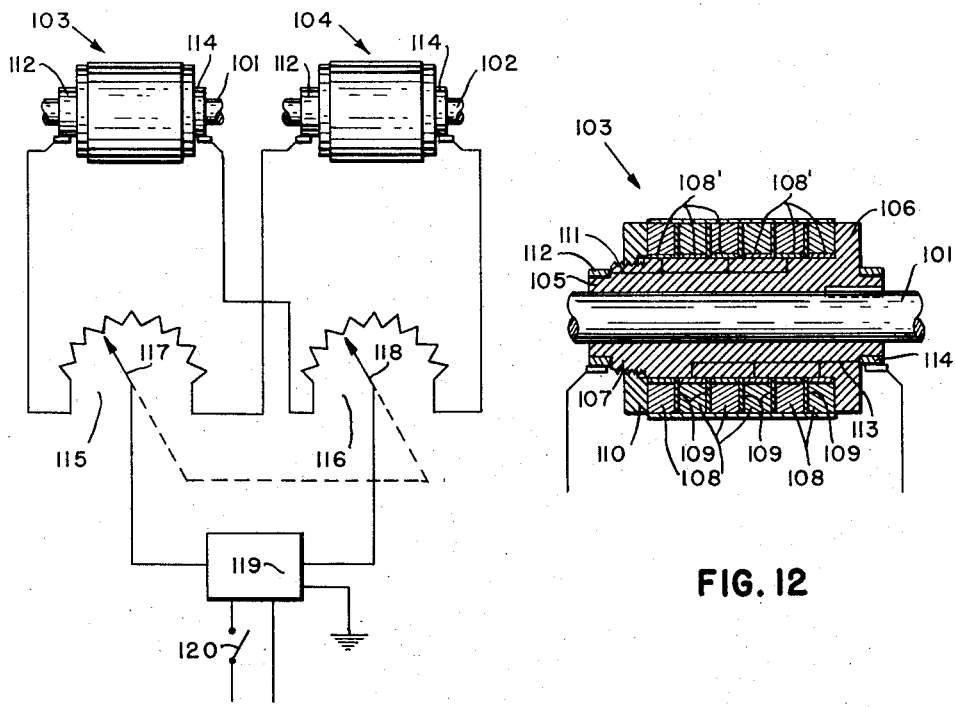
FIG. 12
FIG. 13
INVENTOR.
ROBERT W. WARING
BY
ATTORNEY United States Patent Office 2,897,424
Patented July 28, 1959

2,897,424

ELECTROSTATIC APPARATUS

Robert W. Waring, Fairfield, Conn.

Application November 10, 1953, Serial No. 391,297

24 Claims. (Cl. 317—262)

The present invention relates to apparatus involving the use of the phenomenon based on the Coulomb inverse square law and is related to the subject matter of application Serial Number 375,522, filed August 20, 1953, in the name of Robert W. Waring, now abandoned and the subject matter of which is covered in continuation-in-part application Serial Number 777,804, filed in the name of Robert W. Waring on October 21, 1958.

The above-identified application discloses various forms of mechanical apparatus embodying the principles of a phenomenon based on the Coulomb inverse square law, in which mechanical forces between a semi-conductor and a conducting object of a magnetic or non-magnetic nature are produced and which forces are far in excess of those heretofore accomplished.

The principal object of this invention is to provide an apparatus employing the principles of the invention disclosed in the above-identified application, but modified to an extent to render the apparatus of wider commercial value.

Other objects include the provision of apparatus embodying the principles of the invention disclosed in the above-identified application, but modified in such a manner that a plurality of conducting objects may be held to a supporting apparatus with equal intensities; the provision of such an apparatus in which the conducting objects are at substantially ground potential without being directly connected to the power supply; the provision of such an apparatus in which the location of additional conducting objects on the contacting surface of the apparatus will not substantially affect the forces developed on other objects already located thereon; the provision of such an apparatus which requires no electrical connection to the object or objects on the contacting surface of the apparatus; the provision of such an apparatus in which little or no loss of charge occurs at any location of the surface due to adjacent work pieces; the provision of such an apparatus including a plurality of semi-conductors separated by layers of insulation, and wherein adjacent semi-conductors may be connected to opposite sides of a power pack; the provision of such an apparatus wherein the semi-conductors comprise a plurality of components each surrounded by insulation and arranged in a mosaic or honeycomb pattern, and wherein alternate components both in a longitudinal and transverse direction may be connected to opposite sides of a power pack; the provision of such an apparatus wherein the semi-conductors are arranged to form angularly-disposed active surfaces; the provision of such an apparatus wherein the semi-conductors are arranged to form an object provided with a polygonal cross-sectional construction having a central opening therethrough; the provision of such an apparatus wherein the semi-conductors are in the form of circular discs, and the assembly provided with an opening extending longitudinally along the axis thereof; the provision of such an apparatus in which the power supply may include a center tap to ground; the provision of such an apparatus in which the power supply is an alternating current power source having a center tap to ground, and the output of the power source passes through a rectifier, the opposite leads of which have the same voltage but different polarity relative to ground; and the provision of a method of producing electrostatic forces between a conducting object and elements in closely spaced relation wherein the conducting object is at substantially ground potential.

The above, as well as other objects and novel features of the invention will become apparent from the following specification and accompanying drawings, in which:

Fig. 11 is a schematic illustration of a servo-mechanism to which the principles of the invention have been applied;

Fig. 12 is a sectional view of an element of the apparatus shown in Fig. 11; and Fig. 13 is a schematic wiring diagram for the apparatus shown in Fig. 11.

Figure 1:
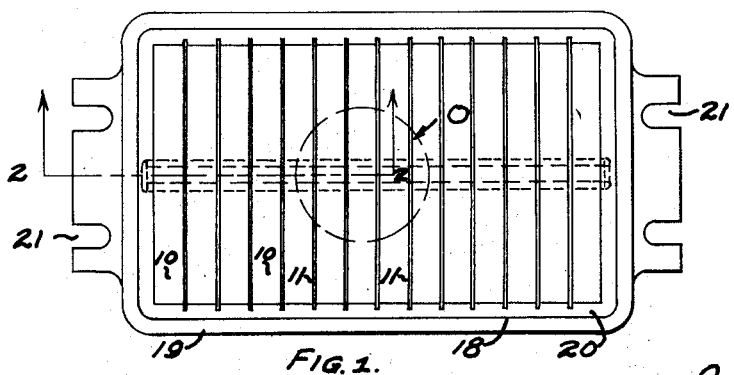
Figure 1 is a top plan view of a laminated work-supporting structure made in accordance with the principles of this invention.
Figure 2:
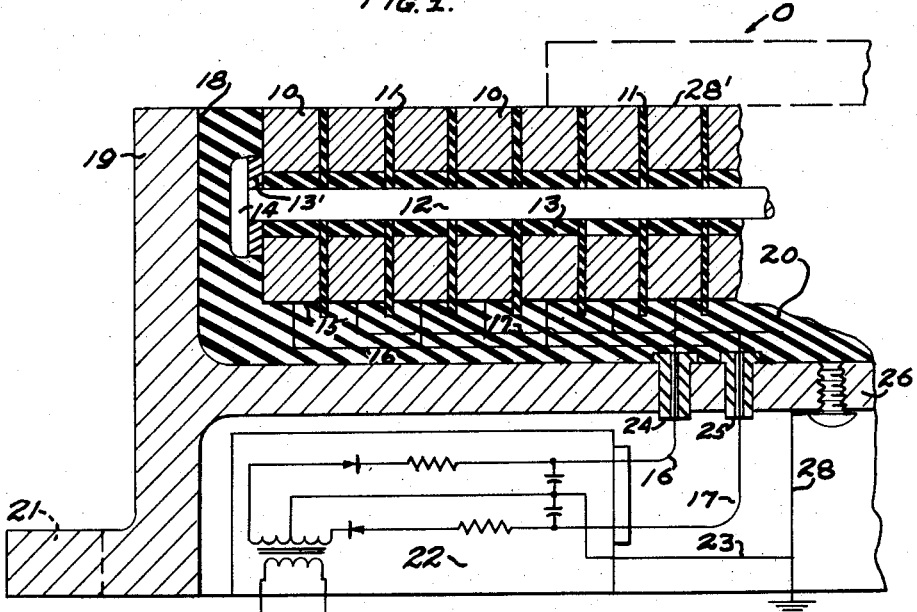
Fig. 2 is an enlarged partial sectional elevational view taken substantially along line 2—2 of Fig. 1.

Referring to Figs. 1 and 2, the principles of the invention are shown as applied to a work-supporting apparatus where it is desired to rigidly hold an electrically-conducting work piece onto a work-supporting surface. A plurality of elements 10 made from a material having a volume resistivity of between substantially $10^2$ and $10^{10}$ ohm centimeters, such for example as limestone, or slate, or any of many conducting materials that have been degraded toward an insulator, or insulating materials degraded toward a conductor, fall within this classification.

Examples of the latter are various metallic oxides such as titanium oxide which has been reduced toward the metal, or the introduction of conducting materials into an insulating compound such as the introduction of a conducting material into a rubber compound to form a homogeneous semi-conducting material. The mechanical properties of such semi-conductors obviously will vary over a relatively large range, and the specific semi-conductor employed will depend upon the specific application to which the principles of the invention are applied. Between each of the elements 10 is provided a suitable insulating and sealing element 11. The assembly is adapted to be rigidly held together by cementing the elements 10 and 11 together, or it may be held together by one or more tie bolts 12 that may extend through the assembly and be provided with insulating bushings 13 surrounding the tie bolts 12 and extending between adjacent insulating elements 11. Additional insulating material 13' may be provided between the head 14 of the through bolt 12 and the adjacent element 10, as well as between the same elements at the opposite end of the bolt 12. The length of the sleeves 13 is slightly less than the thickness of the elements 10 so that the tie bolt 12 rigidly holds the adjacent elements 10 and 11 in fixed relative position. The bottom surface of each of the elements 10 is provided with a layer 15 of conducting material having a volume resistivity less than substantially $10^2$ ohm centimeters intimately and permanently attached thereto. Such a material may be any conductor, and is shown in the present embodiment as being a relatively thin metallic film that can intimately and permanently be attached to one of the surfaces of the semiconductor. From an inspection of Fig. 2, the conducting layer 15 on adjacent elements 10 is separated by the insulating layers 11 which may extend below the lower surface of the semi-conductors 10.

The conducting layer 15 on alternate elements 10 is connected to separate conductors 16 and 17. Preferably, the assembly thus far described is held in spaced relation within a recess 18 of a supporting structure 19 by any of the well-known potting compounds to provide a complete electrical insulating seal and mechanical support 20 for the component parts.

The base 19 is provided with slots 21 to facilitate its being rigidly held to a supporting structure, and also includes a recessed portion in its bottom within which is located a power pack 22 having a center tap to ground 23. The conductors 16 and 17 pass through insulating bushings 24 and 25 within a partition 26 of the base 19. These conductors are connected to the high voltage terminals of the center tap power pack 22, to which power is supplied from lines $L_1$ and $L_2$ and in one or both of which an on-off switch 27 is provided.

In the application of the principles of this invention to the mechanical arts, it is extremely important that low-frequency alternating current be excluded from the working areas of the apparatus in contradistinction to some of the prior art apparatus since accidental contact with low-frequency alternating current promotes involuntary muscular reactions and ventricular fibrillation. With direct current, or high-frequency alternating current, no such muscular reaction occurs.

The power pack 22 may comprise a center tap transformer in combination with a rectifier and filter to provide substantially equal values of electric charges above and below ground potential to the conductors 16 and 17. The power pack 22 may also be provided with the conventional overload relays to prevent damage to the apparatus or injury to the operator, and the ground 23 may also be connected to the base 19 through a conductor 28. Inasmuch as many variables will be present in a structure of the above-described type, including interface condition; surface characteristics of the semi-conductor and work; power loss in the semi-conductor, to name only a few, it is impossible to give a range of potentials within which the apparatus will produce the desired results. However, solely as a non-limiting example which in no way is to be construed as a limitation on the claims, a potential of 3,000 volts direct current plus and minus relative to ground has produced a force of 14 pounds per square inch on a conducting object when utilizing a layer of cellulose acetate .001″ thick in combination with a silicone fluid between the semi-conductors and the the conducting object. A relatively thin layer 28′ of a material having a volume resistivity in excess of $10^{10}$ ohm centimeters, and employed in a manner to produce optimum charges at the surface of the object to be held, may be applied to the top surface of the laminated structure.

It has been found that the relatively thin film of material having a resistivity in excess of that of the relatively thick material of the composite member may be fluid, semi-fluid, or solid in form, or combinations thereof. Examples of such fluids are low polymer silicones such as the commercially-known Dow Corning 200 fluids and certain fluorinated hydrocarbons such as polytetrafluoroethylene and polymonochlorotrifluoroethylene. Examples of such semi-fluids are higher polymer forms of the above-mentioned materials such as the commercially-known Dow Corning #5 compound. Examples of such solids are finely divided metallic oxide materials such as $TiO_2$ and $Al_2O_3$. The latter materials may be used alone, or combined with certain insulating vehicles such as still higher polymer silicones, or phenolic or styrene materials. A desirable characteristic of some of these materials is that they may provide an increase in coefficient of friction. This relatively thin layer of material having a resistivity in excess of the semi-conducting material may also be in the form of a membrane such as polyethylene terephthalate or polystyrene. Numerous other materials having a resistivity in excess of $10^{10}$ ohm centimeters may be employed for specific applications of the principles of the invention. It is often desirable to improve the intimacy of contact between the semi-conductor and the membrane as well as between the membrane and the conducting object by the use of one of the aforementioned fluid or semi-solid materials between the two. As recited in the claims, the material having a resistivity in excess of $10^{10}$ ohm centimeters shall be employed in a manner to produce optimum charge at the surface of the object to be held.

The transverse dimensions of the elements 10 may be of any value; however, preferably, they should be relatively small so that a conducting object placed on the work-supporting surface will overlie a plurality of them. The transverse dimension of the elements 11 should be as small as is consistent with good electrical construction and such that the inactive portion of the work-supporting surface is held to a minimum. Furthermore, the elements 11 preferably should extend beyond the confines of the elements 10, excepting at the work-supporting surface, to anchor the composite assembly within the potting compound 20.

From the foregoing, it is evident that since alternate elements 10 are supplied with substantially equal values of charge but at opposite polarity, a conducting object O supported by the apparatus will be substantially at ground potential. It is, of course, understood that the conducting object O may be of any conducting material having a volume resistivity less than substantially $10^{10}$ ohm centimeters and may be moved into contact with the laminated structure in any of many ways, some of which are shown and described in my copending application previously referred to. This arrangement makes it possible to provide substantially great mechanical attractive forces between the conducting object O and the work-supporting member without requiring the object O to be provided with an actual ground connection. This is in contradistinction to that disclosed in the above-referred-to copending application in which an actual ground connection is required to the conducting object. It is to be understood, however, that it is within the scope of the present invention to provide an actual ground connection to the conducting object O if the same is desired.

Figure 3:
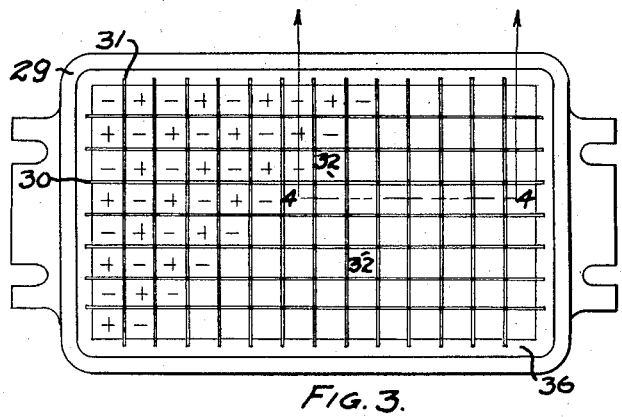
Fig. 3 is a modified form of the structure of Fig. 1 embodying a mosaic construction instead of a laminated construction.
Figure 4:
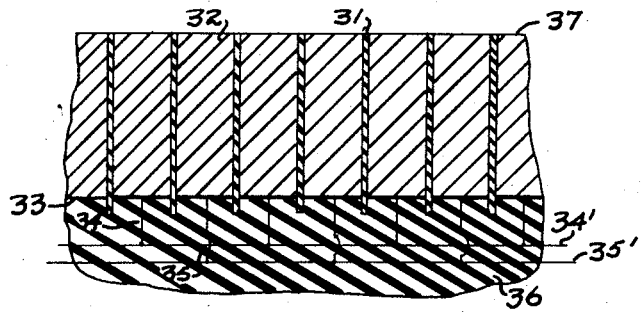
Fig. 4 is an enlarged partial sectional elevational view taken substantially along line 4—4 of Fig. 3.

Referring to Figs. 3 and 4, the principles of the invention are shown as applied to a work-supporting apparatus similar to that shown in Figs. 1 and 2, but of a modified nature. The apparatus shown in Figs. 3 and 4 includes a base 29 similar to the base 19 of Figs. 1 and 2. It comprises a honeycomb construction including equally-spaced insulating elements 30 arranged in parallel relation, and a series of like insulating elements 31 arranged in parallel spaced relation at right angles to the insulating elements 30. The insulating elements 30 and 31 may be of the same material employed for the insulating elements 11 of Figs. 1 and 2. The honeycomb or mosaic structure including the insulating elements 30 and 31 is adapted to have located in each opening thereof an element 32 of a material having a volume resistivity within the limits of $10^2$ to $10^{10}$ ohm centimeters. The elements 32 may be composed of the same material employed in manufacturing the elements 10 of Figs. 1 and 2, and may be either cast in the spaces or they may be individual inserts. The bottom surface of each of the elements 32 is adapted to have applied to it a layer of conducting material 33 that may be the same as material 15 of Figs. 1 and 2. The insulating elements 30 and 31 are adapted to extend below the bottom surfaces 33 so as to separate each from the other.

Separate conductors 34 and 35 are adapted permanently to be connected to alternate surfaces 33 of the elements 32 both horizontally and vertically (Fig. 3). These conductors 34 and 35 are attached to main conductors 34' and 35'. The entire mosaic or honeycomb construction is held in spaced relation relatively to the bottom surface and the side surfaces of the base 29, and potting compound 36 is adapted to surround the entire assembly in a manner to expose the top surface thereof. The top surface of the mosaic construction is formed smoothly and, if desired, a relatively thin layer of material 37 may be provided thereon which has a volume resistivity in excess of $10^{10}$ ohm centimeters, and employed in a manner to produce optimum charge at the surface of the object to be held.

In Fig. 4, the conductors 34 and 35 are shown as connected to alternate elements 32 in one of the horizontally-disposed rows of said elements in the mosaic structure of Fig. 3. It is to be understood that each of the conductors 34 and 35 for each of the horizontally-disposed rows of elements 32 in Fig. 3 is connected to the main conductors 34' and 35' respectively, which latter lead to a power pack similar to that shown in Fig. 2. That is, these conductors 34' and 35' are adapted to be connected to the opposite sides of a power pack having a center tap to ground so that alternate top surfaces of the elements 32 are supplied with substantially equal values of charge, but of opposite polarity relative to ground. Accordingly, a conducting object placed on the top surface of the mosaic structure will automatically be at substantially ground potential for the reasons set forth in accordance with the substantially ground potential of the conducting object O of Fig. 2.

Figure 5:
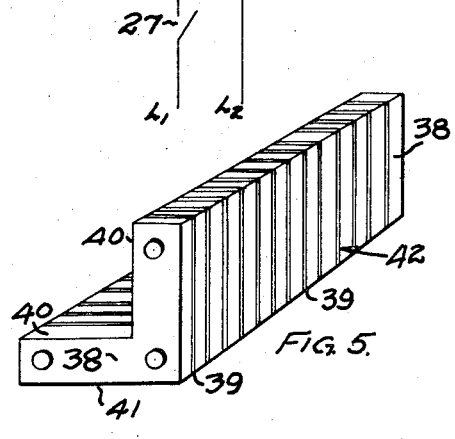
Figs. 5, 6 and 7 are modified forms of the surface configuration of the laminated structure of Fig. 1.
Figure 7:
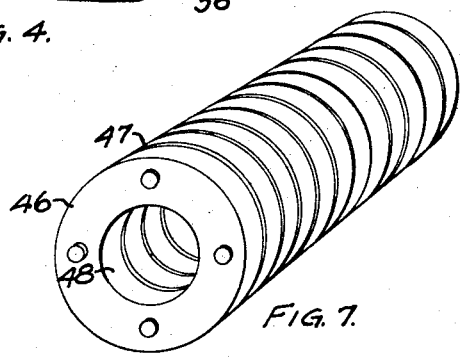
Figure 6:
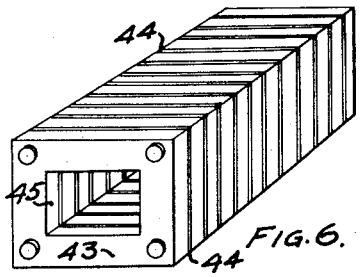

It is within the scope of the present invention, of course, to form a work-supporting or active surface of the laminated or mosaic structure in various forms and, if desired, all of the structures described herein can be electrically operated in the manner described in my copending application above referred to. Referring to Figs. 5, 6 and 7, three different forms of laminated structures are shown. These illustrate equivalent structures having different active surface configurations, adapted for different applications of the principles of the invention.

Referring to Fig. 5, a plurality of L-shaped semi-conducting elements 38 made from the same material that was employed in making the elements 10 of Fig. 1 are adapted to be held in fixed relation to each other with layers of insulating material 39 interposed between each. The surfaces 40 of the construction shown in Fig. 5 of the L-shaped elements 38 are adapted to be coated with a layer of conducting material. Alternate of these conducting surfaces are adapted to be connected in the same manner as alternate conducting surfaces 15 of Fig. 2 are connected. The angular-shaped embodiment of Fig. 5 may be placed on a surface plate such that its surface 41 engages the surface plate. The surface 42 can then be employed to actively hold conducting objects thereto.

Referring to Fig. 6, the configuration of the structure takes the form of a series of polygonally-shaped semi-conducting elements 43 rigidly held together with layers of insulating material 44 between each to form a polygonal construction having a hole through the center thereof. The inner peripheral surfaces 45 of the elements 43 of the polygonal construction shown in Fig. 6 are adapted to be coated with a layer of conducting material that is separated by the insulating elements 44. Alternate surfaces 45 throughout the interior length of the polygonal member shown in Fig. 6 are adapted to be connected to separate terminals that lead to a power pack in the same manner in which the apparatus in Fig. 2 is connected to its power pack. The embodiment shown in Fig. 6 will electrostatically adhere to any conducting support and provides three additional active surfaces.

Referring to Fig. 7, the configuration of the structure takes the form of a cylinder and is made up of a plurality of annular, semi-conducting elements 46 that are rigidly held together with similarly-shaped layers of insulating material 47 therebetween. The inner peripheral surfaces of elements 46 are adapted to be coated with a layer 48 of conducting material in the same way that the surfaces 15 of the elements 10 of Fig. 2 are coated. The layers of conducting material 48 on alternate semi-conducting elements 46 are adapted to be connected to separate conductors leading to a power pack similar to that shown in Fig. 2. The cylindrical object of Fig. 7 is particularly advantageous when employed as a driving element for flexible members such as conveyor belts, the transportation of thin sheets and the like.

All of the configurations in Figs. 5, 6 and 7 in the same manner as the embodiment shown in Fig. 2, are adapted to have their outer peripheral or active surfaces coated with a relatively thin layer of material having a volume resistivity in excess of $10^{10}$ ohm centimeters. As recited in the claims, the material having a resistivity in excess of $10^{10}$ ohm centimeters shall be employed in a manner to produce optimum charges at the surface of the object to be held.

Although the various features of the improved electrostatic apparatus have been shown and described in detail to fully disclose several embodiments of the invention, it will be evident that numerous changes may be made in such details, and certain features may be used without others, without departing from the principles of the invention.

Figure 8:
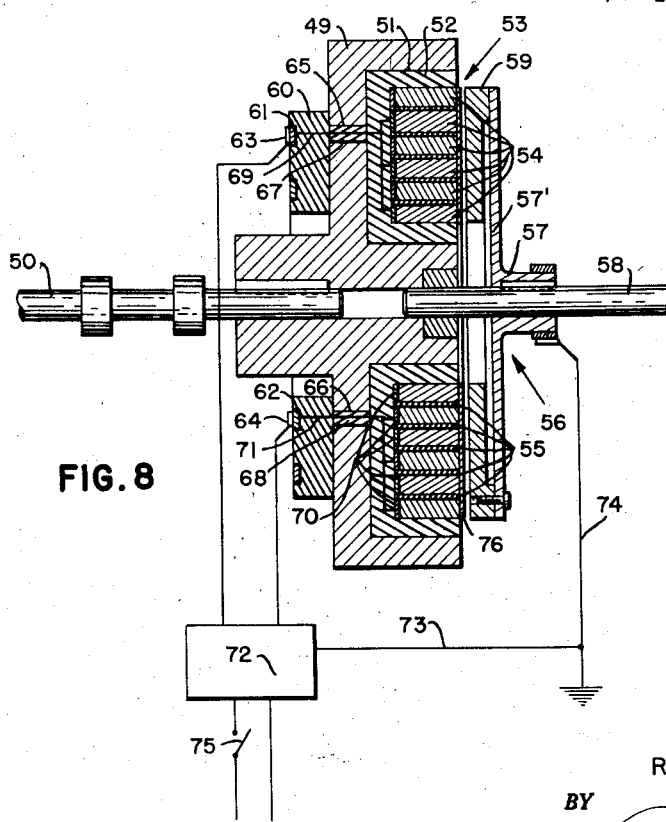
Fig. 8 is a sectional view of a clutch or brake to which the principles of the invention have been applied.

Referring to Fig. 8, in which is disclosed a sectional elevational view of a clutch to which the principles of the invention have been applied, a driving element 49 that may be made of any structural material, cast or otherwise, is keyed to an input shaft 50. The member 49 is recessed at 51 to receive an insulating liner 52 similar to the insulating liner 20 of the apparatus shown in Fig. 2. The insulating liner 52 is recessed to receive a composite member 53 made up of a series of concentrically-arranged rings 54 of a material selected from the categories of materials from which the elements 10 of Fig. 1 are made. Between each concentrically-arranged ring 54 is a ring 55 of insulating material. The composite member 53, of course, is suitably attached to the member 49, as is the insulating liner 52.

A disc 56 of any conducting material is provided with a hub 57 keyed to the output shaft 58 that is suitably mounted in alignment with shaft 50. A relatively thin, flexible portion 57' of disc 56 extends between the hub 57 and an annular portion 59 of the disc 56. The annular portion 59 is spaced a very slight distance from the outer surface of the composite member 53 in the order of about one or two thousandths of an inch.

An insulating ring 60 is attached to the member 49 and supports annular collector rings 61 and 62 adapted to contact brushes 63 and 64 so that electric charges can be supplied to the collector rings while the member 49 is rotating. The member 49 is provided with bores 65 and 66 and include insulating sleeves 67 and 68 extending from the insulating liner 52 to the insulating ring 60. A conductor 69 extends from the current-carrying ring 61 on the insulating annular ring 60 through the sleeve 67 to the rear surface of the composite member 53 and makes electrical contact with a layer 70 of conducting material having a volume resistivity less than $10^2$ ohm centimeters that is of annular form and intimately attached to the unexposed faces of alternate concentric rings 54 of the composite member 53.

The annular ring 62 is connected to a conductor 71 that extends through the insulating sleeve 68 and in electrical contact with a layer of conducting material 70 intimately and permanently attached to the unexposed faces of the remainder of the concentrically arranged rings 54. The insulating rings 55 extend rearwardly to the insulating liner 52 thereby electrically separating the layers 70 of conducting material on adjacent rings 54.

The brushes 63 and 64 are connected through conductors to the opposite poles of a power pack 72. Although the center tap of the power pack 72 is grounded through a conductor 73, and no ground is theoretically needed for the disc 56, one may be provided through the line 74 for the purpose of leaking off any stray currents that may be present. The power pack 72 is of the same type as that shown at 22 in Fig. 2, providing electric charges of opposite polarity to the back surfaces of alternate rings 54 of the composite member 53. A layer 76 of a material having a volume resistivity in excess of $10^{10}$ ohm centimeters, such as that shown at 23' of Fig. 2, is provided between the exposed face of the composite member 53 and the adjacent face of the disc 56.

With the input shaft 50 rotating and a relay 75 open, the output shaft 58 remains at rest. Upon closing the switch 75, electrostatic attraction is created between the composite member 53 and the disc 56, thereby drawing the latter into intimate contact with the outer surface of the composite member 53, whereupon the rotation of shaft 50 is transmitted to the output shaft 58. Opening the switch 75 removes the source of electric charges between the composite member 53 and the disc 56, whereupon the flexible nature of the portion 57' of the disc 56 separates the portion 59 thereof from the front surface of the composite member 53.

It is obviously within the scope of the above disclosure to utilize substantially the same mechanism for a brake. In such an instance the member 49 will be rigidly attached to a stationary frame member, the brushes 63 and 64 as well as rings 61 and 62 may be eliminated, and conductors 69 and 71 may extend directly to the power pack 72.

Figures 9, 10:
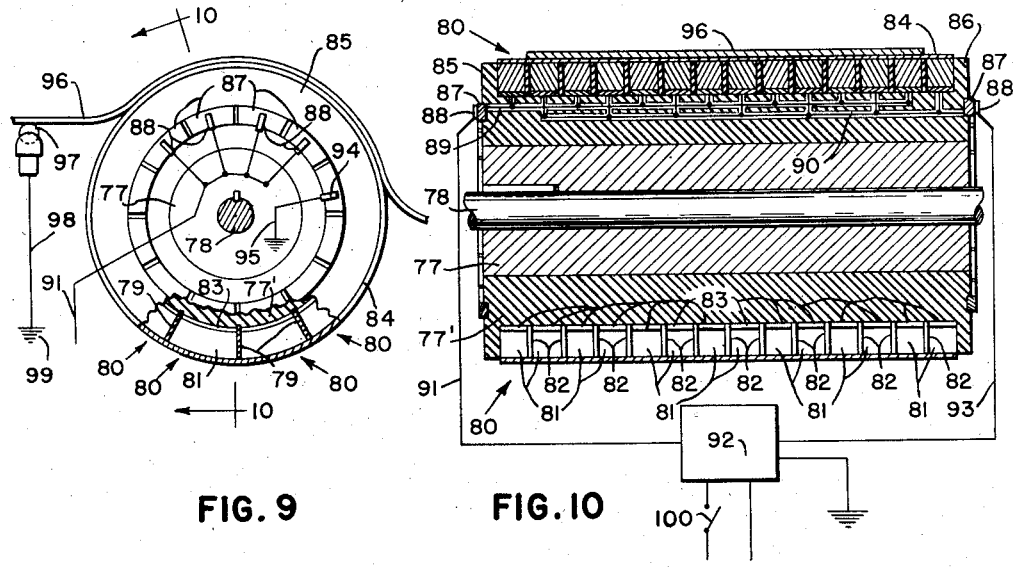
Fig. 9 is a sectional view of a portion of a conveyor to which the principles of the invention have been applied.
Fig. 10 is a sectional view taken substantially along line 10—10 of Fig. 9.

Referring to Figs. 9 and 10, in which is disclosed a rotatable conveyor apparatus embodying the principles of the invention, a cylindrical body 77 of any suitable material is keyed to a driving shaft 78. The body 77 supports in fixed relation an insulating tubular member 77' of any of the well-known structural electrical insulating materials. The outer surface of the insulating member 77' is in the form of insulating axial ribs 79 equally spaced about the periphery of the member 77'. Between the ribs 79 are located arcuate sectional members 80 formed of a composite construction. Referring to Fig. 10, each arcuate composite member 80 is made up of arcuate elements 81 separated by insulating elements 82. The elements 81 are made from one of the semi-conducting compositions previously referred to and having an electrical characteristic of a volume resistivity between the limits of substantially $10^2$ and $10^{10}$ ohm centimeters. Each of the elements 81 is provided with an inner coating 83 of one of the materials having a resistivity less than $10^2$ ohm centimeters. The insulating elements 82 extend inwardly to a point contacting the insulating body 77' thereby separating the layers 83 on adjacent elements 81. The outer surface of the composite members 80 is provided with a relatively thin layer 84 of material selected from the category of those previously described having a volume resistivity in excess of $10^{10}$ ohm centimeters. Each of the arcuate composite members 80 is rigidly fixed to the insulating body member 77' by end flanges 85 and 86 in a manner to form a unitary structure adapted to be rotated by the drive shaft 78. The layer 84 of the composite members 80 may be confined to the surfaces of the members 80, or it may be continuous, bridging the ribs 79.

Each end of the assembly is provided with a series of contact shoes 87, one for each of the members 80 and adapted to be contacted by a number of current-carrying brushes 88 resiliently urged into contact with the shoes 87.

The conducting layers 83 on alternate elements 81 of each member 80 are electrically connected through a line 89 to the corresponding shoe 87 on the left end of the assembly of Fig. 10. The conducting layers 83 on the remaining elements 81 of each member 80 are electrically connected through a line 90 to the corresponding shoe 87 on the right end of the assembly. All of the brushes 88 on the left end of the assembly are connected to a common line 91 leading to the one pole of a power pack 92; while all the brushes 88 on the right end of the assembly of Fig. 10 are connected to a common line 93 leading to the opposite pole of the power pack 92.

It will be noted that the brushes 88 are in contact with only a few of the shoes 87 and these brushes are all connected to a common conductor leading to one side of the power pack 92. The power pack 92 is generally of the same design as that employed in the apparatus shown in Figs. 2 and 8. Additional brushes 94 (only one of which is shown in Fig. 9) are provided to contact the shoes 87 as they pass them, and these brushes are connected to ground at 95. A conveyor belt, or conducting sheet of material 96 adapted to be conveyed by the apparatus, rests on the outer periphery of the unitary rotatable structure and is in contact with certain of the members 80 that in turn are in contact with the brushes 88. An idler pulley 97 contacts the belt, or conducting material 96, and itself is connected to a conductor 98 that leads to a ground connection 99. While this latter ground is unnecessary, it may be employed for the reason ground connection 74 of Fig. 8 is provided. Alternating current is supplied to the power pack 92 from lines $L_1$ and $L_2$ in the usual manner and an on-off switch 100, or other voltage control means, is provided for controlling the operation of the conveying apparatus by an operator.

With the apparatus in the condition as shown in Figs. 9 and 10, and with switch 100 closed, the belt or material 96 is at ground potential since alternate elements 81 of those members 80 that are in electrical connection with brushes 88 are at equal potentials above and below ground. Accordingly, an electrostatic force is created between the belt or material 96 and the members 80 that are in contact with the brushes 88. Clockwise rotation of the unitary assembly, therefore, causes the belt 96 to be moved rightwardly (Fig. 9). As each member 80 passes from contact with the rightmost brushes 88, it contacts the brushes 94, thereby grounding said member. Accordingly, the charges on the member 80 are discharged and no attractive force is present between it and the belt or material 96. Opening switch 100 at any time removes the source of power, and the only charges remaining between the belt 96 and the members 80 in contact with brushes 88 are residual charges which are removed during the next succeeding revolution of the unitary assembly as each member 80 contacts the grounded brushes 94.

The previously-described conveying apparatus shown in Figs. 9 and 10 has particular advantage in the conveying of conducting sheets since a relatively large area of the sheet is provided with an equal attractive force distributed thereover which will permit substantial forces being applied to the strip in conveying it, as distinguished from the high unit force inherent in such structures where a thin sheet of material passes between two rollers, making line contact therewith. It is, of course, within the scope of the disclosure of Figs. 9 and 10 to employ an endless belt of conducting material which is resiliently urged against, say, a non-conducting, relatively thin strip of material desired to be conveyed. The endless belt is electrostatically forced into contact with the non-conducting strip lying over a portion of the surface of the main rotating assembly, and the thin, non-conducting strip being conveyed may then take the place of the relatively thin surface 84 of a resistivity in excess of $10^{10}$ ohm centimeters.

Referring to Figs. 11, 12 and 13 in which is disclosed a schematic showing of a servo-mechanism embodying the principles of the invention, and referring particularly to Fig. 11, two power-supplying shafts 101 and 102, which may be of insulating material, or at least insulated from the mechanism to be described, as well as supporting bearings therefor, support identical rotatable drum mechanisms 103 and 104.

Referring to Fig. 12, the drum 103 is shown in detail and comprises a tubular member 105 of insulating material keyed to shaft 101. The tubular member 105 includes a flange 106 at its one end and a threaded portion 107 at its opposite end. Between the flange 106 and the threads 107 are a plurality of discs 108 separated by insulating discs 109. A nut 110 threaded onto the portion 107 holds the assembly together. The inner peripheral surface 108' of each of the discs 108 is coated with a layer of material having a volume resistivity less than $10^2$ ohm centimeters. The insulating discs 109 extend inwardly to the tubular member 105 so that the layers 108' of conducting material on the inner periphery of adjacent discs 108 are separated from each other. The conducting layers of alternate discs 108 are connected to a common conductor 111 which extends to and is in electrical contact with a slip ring 112 on the one end of the member 105. The conducting layers of the remaining discs 108 are connected to a common conductor 113 that extends to and is in electrical contact with a slip ring 114 at the other end of the member 105.

Referring to Fig. 13, the slip rings 112 of both drum mechanisms are connected to opposite ends of a potentiometer 115; while the slip rings 114 of both drum mechanisms are connected to opposite ends of a potentiometer 116. The adjusting arms 117 and 118 of the potentiometers 115 and 116 are connected together mechanically and are electrically connected to the opposite pole of a power pack 119. The power pack 119 is the same as power pack 22 of Fig. 2 and is supplied with alternating current from lines $L_1$ and $L_2$ past an on-off switch 120.

Referring again to Fig. 11, the drum members 103 and 104 are adapted to be rotated in the same direction. An endless belt 121 of conducting material is adapted to surround a portion of each of the members 103 and 104 in a reverse relation and also to surround idler pulleys 122, 123 and 124. A layer 125 of material having a volume resistivity in excess of $10^{10}$ ohm centimeters is located between the outer peripheral surface of each of the drum mechanisms 103 and 104 and the inner surface of the belt 121.

With the apparatus in the condition shown in Fig. 11, and the arms 117 and 118 in the central position of the potentiometers 115 and 116, equal values of charge are supplied to the members 103 and 104 while the conducting belt 121 is at ground potential. Accordingly, as the shafts 101 and 102 are rotated in the same direction, the endless belt 121 slides over the outer periphery of the composite members 103 and 104 so that a load 126 attached to the endless belt 121 does not move. Movement of the potentiometer arms 117 and 118 to the left (Fig. 13) raises the charge applied to the elements 108 of the member 103 and reduces the charge applied to the elements 108 of the member 104 so that greater electrostatic forces are generated between the member 103 and the endless belt 121, and lower electrostatic forces are generated between the member 104 and the endless belt 121, thereby causing the load 126 to move rightwardly. When the load 126 has become re-positioned, or satisfied the demands of the apparatus, means of usual form (not shown) may cause the potentiometer to centralize itself, whereupon the voltages and consequently the forces between the member 104 and the belt 121 and those between member 103 and belt 121 become equalized and the load remains in its adjusted position, while the members 103 and 104 continue to rotate.

Any of the usual systems of servo-feedback may be used to control the position of the potentiometer arms 117 and 118 and, consequently, the position of the load 126.

It is, of course, within the scope of this disclosure to substitute a double pole double throw switch for the potentiometers 115 and 116, in which case the maximum force is selectively and instantly available at either of the members 103 or 104.

Although the various features of the new and improved electrostatic apparatus have been shown and described to disclose several embodiments of the invention, it will be evident that certain features may be used without others without departing from the principles of the invention.

What is claimed is:

1. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; a power pack having a tap to ground and adapted to produce at its output poles direct current at substantially equal voltages of opposite polarity; means for connecting the layer of conducting material on the one surface of alternate laminae to one pole of said power pack; and means for connecting the layer of conducting material on the one surface of the remaining laminae to the other pole of said power pack.

2. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; a power pack having a tap to ground adapted to provide electric charges of substantially equal value and opposite polarity at its respective poles; means for connecting the layer of conducting material on the one surface of alternate laminate to one pole of said power pack; and means for connecting the layer of conducting material on the one surface of the remaining laminae to the other pole of said power pack.

3. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; a power pack having a tap to ground and adapted to produce at its output poles direct current at substantially equal voltages of opposite polarity; means for connecting the layer of conducting material on the one surface of alternate laminae to one pole of said power pack means for connecting the layer of conducting material on the one surface of the remaining laminae to the other pole of said power pack; means for connecting the layer of conducting material on the one surface of the remaining laminae to the other pole of said power pack; an electrically conducting object adapted to be moved into contact with surfaces of said laminae other than those to which said conducting material is attached; and a layer of material having a volume resistivity in excess of that of said semi-conducting material between said object and the surfaces of said laminae with which said object is moved into contact.

4. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permantenly attached to one surface of each of said laminae; a power pack having a tap to ground adapted to provide substantially equal amounts of electric charge of opposite polarity at its respective poles; means for connecting the layer of conducting material on the one surface of alternate laminae to one pole of said power pack; means for connecting the layer of conducting material on the one surface of the remaining laminae to the other pole of said power pack; an electrically conducting object adapted to be moved into contact with surfaces of said laminae other than those to which said conducting material is attached; and a layer of material having a volume resistivity in excess of that of said semi-conducting material between said object and the surfaces of said laminae with which said object is moved into contact.

5. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; a power pack having a tap to ground and adapted to produce at its output poles direct current at substantially equal voltages of opposite polarity; means for connecting the layer of conducting material on the one surface of alternate laminae to one pole of said power pack; means for connecting the layer of conducting material on the one surface of the remaining laminae to the other pole of said power pack; a conducting object adapted to be placed on a surface of said laminated structure other than the surface to which said conducting material is attached; and a relatively thin layer of material having a volume resistivity in excess of substantially $10^{10}$ ohm centimeters between said conducting object and the surface of said laminated structure supporting it.

6. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; a power pack having a tap to ground adapted to provide substantially equal amounts of electric charge of opposite polarity at its respective poles; means for connecting the layer of conducting material on the one surface of alternate laminae to one pole of said power pack; means for connecting the layer of conducting material on the one surface of the remaining laminae to the other pole of said power pack; a conducting object adapted to be placed on a surface of said laminated structure other than the surface to which said conducting material is attached; and a relatively thin layer of material having a volume resistivity in excess of substantially $10^{10}$ ohm centimeters between said conducting object and the surface of said laminated structure supporting it.

7. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to a surface of each of said laminae; two separate electrical conductors one connecting the layer of conducting material on the one surface of alternate of said laminae, and the other connecting the layer of conducting material on the one surface of the remaining laminae; a base structure for supporting said laminated apparatus; a potting compound insulating said laminated apparatus within said base in a manner exposing at least one of its faces; a power pack having a tap to ground adapted to provide substantially equal amounts of electric charge of opposite polarity at its respective poles; means for connecting said separate conductors to opposite poles of said power pack; an electrically-conducting object adapted to be moved into contact with the exposed faces of said laminae; and a relatively thin layer of a material having a volume resistivity in excess of that of said semi-conducting material between said conducting object and said exposed faces of said laminae.

8. An electrostatic apparatus comprising in combination, a plurality of laminae made from a semi-conducting material having a volume resistivity of between substantially $10^2$ and $10^{10}$ ohm centimeters; electrical insulating means between adjacent laminae; a layer of a conducting material having a volume resistivity less than substantially $10^2$ ohm centimeters intimately and permanently attached to one surface of each of said laminae; two separate conductors in one electrical contact with the layer of conducting material on the one surface of alternate laminae, and the other connecting the layer of conducting material on the one surface of the remaining laminae; a base for supporting said laminated structure; a potting compound insulating said laminated structure from said base, and exposing a surface of said laminated structure opposite that to which said conducting material is attached; a power pack having a tap to ground adapted to provide substantially equal amounts of electric charge of opposite polarity at its respective poles; means for connecting the separate conductors to opposite poles of said power pack; a conducting object adapted to be replaceably moved into contact with an exposed surface of said laminated structure; and a relatively thin layer of material having a volume resistivity in excess of substantially $10^{10}$ ohm centimeters between said conducting object and said laminated structure.

9. An electrostatic apparatus comprising in combination, a honeycomb-like structure of electrical insulating material; a semi-conducting material having a volume resistivity of between substantially $10^2$ and $10^{10}$ ohm centimeters within the spaces of said honeycomb-like structure that are surrounded by said insulating material; a layer of a conducting material having a volume resistivity less than substantially $10^2$ ohm centimeters intimately and permanently attached to one of the faces of each of said individual components of semi-conducting material; a power pack having a tap to ground adapted to provide substantially equal amounts of electric charge of opposite polarity at its respective poles; means for connecting the layer of conducting material on the one surface of alternate components of said semi-conducting material in both a longiutdinal and a transverse direction to one pole of said power pack; and means for connecting the layer of conducting material on the one surface of the remainder of said components of said semi-conducting material to the other pole of said power pack.

10. An electrostatic apparatus comprising in combination, a honeycomb-like structure of electrical insulating material; a semi-conducting material having a volume resistivity of between substantially $10^2$ and $10^{10}$ ohm centimeters within the spaces of said honeycomb-like structure that are surrounded by said insulating material; a layer of a conducting material having a volume resistivity less than substantially $10^2$ ohm centimeters intimately and permanently attached to one of the faces of each of said individual components of semi-conducting material; a power pack having a tap to ground and adapted to produce at its output poles direct current at substantially equal voltages of opposite polarity; means for connecting the layer of conducting material on the one surface of alternate components of said semi-conducting material in both a longitudinal and a transverse direction to one pole of said power pack; means for connecting the layer of conducting material on the one surface of the remainder of said components of said semi-conducting material to the other pole of said power pack; and a conducting object adapted to be moved into contact with the surfaces of said individual components of semi-conducting material other than those to which said layer of conducting material is attached.

11. An electrostatic apparatus comprising in combination, a honeycomb-like structure of electrical insulating material; a semi-conducting material having a volume resistivity of between substantially $10^2$ and $10^{10}$ ohm centimeters within the spaces of said honeycomb-like structure that are surrounded by said insulating material; a layer of a conducting material having a volume resistivity less than substantially $10^2$ ohm centimeters intimately and permanently attached to one of the faces of each of said individual components of semi-conducting material; a power pack having a tap to ground adapted to provide substantially equal amounts of electric charge of opposite polarity at its respective poles; means for connecting the layer of conducting material on the one surface of alternate components of said semi-conducting material in both a longitudinal and a transverse direction to one pole of said power pack; means for connecting the layer of conducting material on the one surface of the remainder of said components of said semi-conducting material to the other pole of said power pack; a conducting object adapted to be moved into contact with the surfaces of said individual components of semi-conducting material other than those to which said layer of conducting material is attached; and a relatively thin layer of a material having a volume resistivity in excess of that of said semi-conducting material between said conducting object and said exposed faces of said laminae.

12. An electrostatic apparatus comprising in combination, a honeycomb-like structure of electrical insulating material; a semi-conducting material having a volume resistivity of between substantially $10^2$ and $10^{10}$ ohm centimeters within the spaces of said honeycomb-like structure that are surrounded by said insulating material; a layer of a conducting material having a volume resistivity less than substantially $10^2$ ohm centimeters intimately and permanently attached to one of the faces of each of said individual components of semi-conducting material; a power pack having a tap to ground adapted to provide substantially equal amounts of electric charge of opposite polarity at its respective poles; means for connecting the layer of conducting material on the one surface of alternate components of said semi-conducting material in both a longitudinal and a transverse direction to one pole of said power pack; means for connecting the layer of conducting material on the one surface of the remainder of said components of said semi-conducting material to the other pole of said power pack; a conducting object adapted to be moved into contact with the faces of said individual components of semi-conducting material opposite that to which said conducting material is attached; and a relatively thin layer of material having a volume resistivity in excess of substantially $10^{10}$ ohm centimeters between said conducting object and the surface of said semi-conducting components adjacent thereto.

13. An electrostatic apparatus comprising in combination, a honeycomb-like structure of electrical insulating material; a semi-conducting material having a volume resistivity between substantially $10^2$ and $10^{10}$ ohm centimeters within the spaces of said honeycomb-like structure that are surrounded by said insulating material; a layer of a conducting material having a volume resistivity less than $10^2$ ohm centimeters intimately and permanently attached to one of the faces of each of said individual components of semi-conducting material; two separate conductors one adapted to be electrically connected to the layer on the surface of alternate components of said semi-conducting material in both a longitudinal and a transverse direction, and the other connecting the layer of material on the surface of the remaining components of said semi-conducting material; a base; means for supporting said honeycomb-like structure in spaced relation to said base; a potting compound surrounding said honeycomb-like structure, exposing its top surface; a power pack having a tap to ground adapted to provide substantially equal amounts of electric charge of opposite polarity at its respective poles; means for connecting said separate conductors to opposite poles of said power pack; an electrically-conducting object adapted to be moved into contact with the top surface of said honeycomb-like structure; and a relatively thin layer of material having a volume resistivity in excess of that of said semi-conducting material between said electrically-conducting object and the top surface of said honeycomb-like structure.

14. An electrostatic apparatus comprising in combination, a honeycomb-like structure of electrical insulating material; a semi-conducting material having a volume resistivity between substantially $10^2$ and $10^{10}$ ohm centimeters within the spaces of said honeycomb-like structure that are surrounded by said insulating material; a layer of a conducting material having a volume resistivity less than substantially $10^2$ ohm centimeters intimately and permanently attached to one of the faces of each of said individual components of semi-conducting material; two separate conductors one electrically connected to the layer of conducting material on the one surface of alternate components of said semi-conducting material in both a longitudinal and a transverse direction, and the other connecting the layer of material on the surface of the remaining components of said semi-conducting material; a base for supporting said honeycomb-like structure; a potting compound surrounding said honeycomb-like structure in a manner to expose the faces of said semi-conducting material opposite that to which said conducting material is attached; a power pack having a tap to ground adapted to provide substantially equal amounts of electric charge of opposite polarity at its respective poles; means for connecting said separate conductors to opposite poles of said power pack; a conducting object adapted to be moved into contact with the exposed face of said honeycomb-like structure; and a relatively thin layer of material having a volume resistivity in excess of substantially $10^{10}$ ohm centimeters between said conducting object and the exposed face of said honeycomb-like structure.

15. The method of producing an arresting mechanical force between an electrically conducting object and separate surfaces of elements in closely-spaced relationship with said conducting object which comprises providing electric charges of opposite polarity on said separate surfaces; and providing a relatively thin layer of a material having a volume resistivity in excess of substantially $10^{10}$ ohm centimeters between said conducting object and said surfaces.

16. The method of producing an arresting mechanical force on an electrically conducting object which comprises placing a conducting object on a laminated structure in which said laminae are made of a material having a volume resistivity between substantially $10^2$ and $10^{10}$ ohm centimeters and separated by layers of insulating material, and to each of which laminae is permanently attached a layer of a material having a volume resistivity of less than substantially $10^2$ ohm centimeters, providing electric charges of opposite polarity on alternate laminae of said laminated structure; and maintaining said charges of opposite polarity on said laminae.

17. The method of producing an arresting mechanical force on a conducting object which comprises providing electric charges of opposite polarity on alternate laminae of a laminated structure supporting said conducting object in which said laminae are made from a material having a volume resistivity of between the limits of substantially $10^2$ to $10^{10}$ ohm centimeters and separated by layers of insulating material, and to each of which laminae is permanently attached a layer of material having a volume resistivity of less than substantially $10^2$ ohm centimeters, and providing a relatively thin layer of a material having a volume resistivity in excess of that of said material having a volume resistivity between substantally $10^2$ and $10^{10}$ ohm centimeters between said conducting object and said laminated structure.

18. A laminated structure for use with an electrostatic apparatus comprising in combination, a plurality of angularly-formed laminae made from a material having a volume resistivity between the limits of substantially $10^2$ to $10^{10}$ ohm centimeters; electrically insulating layers between adjacent angularly-shaped laminae; means for holding said laminae and layers of insulation in intimate contact with each other; and a separate layer of a material having a volume resistivity less than substantially $10^2$ ohm centimeters intimately and permanently attached to one or more surfaces of each lamination of said laminated structure.

19. A laminated structure for use with an electrostatic apparatus comprising a plurality of polygonally-shaped annular laminae made of a material having a volume resistivity of between the limits of substantially $10^2$ and $10^{10}$ ohm centimeters; similarly-shaped layers of electrically insulating material located between adjacent laminae; means for holding said laminae and layers of electrically insulating material intimately together to provide a polygonally-shaped structure; and a layer of material having a volume resistivity less than substantially $10^2$ ohm centimeters intimately and permanently attached to the inner peripheral edges of said laminae, said relatively thin layers on adjacent laminae being separated by said layers of electrically insulating material.

20. A laminated structure for use with an electrostatic apparatus comprising a plurality of annular-shaped laminae made from a material having a volume resistivity of between substantially $10^2$ and $10^{10}$ ohm centimeters; a plurality of similarly-shaped layers of electrically insulating material located between adjacent laminae; means for holding said laminae and layers of electrically insulating material in intimate contact to provide a hollow, cylindrical laminated structure; and a layer of material having a volume resistivity less than substantially $10^2$ ohm centimeters intimately and permanently attached to one of the peripheral surfaces of each of said laminae, and separated from each other by said layers of electrically insulating material.

21. A device for use with an electrostatic apparatus comprising in combination, a honeycomb-like structure of electrical insulating material; semi-conductors having a volume resistivity between the limits of $10^2$ and $10^{10}$ ohm centimeters within the voids of said honeycomb-like structure; and individual layers of material having a volume resistivity less than substantially $10^2$ ohm centimeters intimately and permanently attached to one of the exposed surfaces of each of said semi-conductors.

22. A structure for use with an electrostatic apparatus comprising in combination, a plurality of elements made from a material having a volume resistivity between the limits of substantially $10^2$ to $10^{10}$ ohm centimeters; a plurality of electrically insulating members adapted to be located between adjacent elements; means for holding said elements and said insulating members together to form a contiguous structure having at least one active face; and a layer of a material having a volume resistivity less than substantially $10^2$ ohm centimeters intimately and permanently attached to at least one face of each of said elements and separated from each other by said insulating members.

23. A laminated structure for use with an electrostatic appartus comprising in combination, a plurality of laminae made from a material having a volume resistivity between the limits of substantially $10^2$ to $10^{10}$ ohm centimeters; a plurality of similarly-shaped layers of electrically insulating material adapted to be located between adjacent laminae; means for holding said laminae and relatively thin layers of insulating material together to form a laminated structure having at least one active face; and a layer of a material having a volume resistivity less than substantially $10^2$ ohm centimeters intimately and permanently attached to at least one face of each of said laminae and separated from each other by said layers of insulating material.

24. The method of producing an arresting mechanical force which comprises providing electric charges of opposite polarity on separate surfaces of elements having a volume resistivity between substantially $10^2$ and $10^{10}$ ohm centimeters; placing an electrically conducting object in closely-spaced relation to said separate surfaces in a manner to effect separation of the electric charges in said conducting object; and maintaining said electric charges of opposite polarity on said separate surfaces.

References Cited in the file of this patent

UNITED STATES PATENTS

| | | |
|---|---|---|
| 2,025,123 | Rahbek | Dec. 24, 1935 |
| 2,148,482 | Lorenz | Feb. 28, 1939 |
| 2,311,276 | Wilcox | Feb. 16, 1943 |
| 2,417,850 | Winslow | Mar. 25, 1947 |